United States Patent
Cox

[11] 3,856,333
[45] Dec. 24, 1974

[54] DRIP IRRIGATOR DEVICE

[75] Inventor: Edwin Dexter Cox, Pine, Colo.

[73] Assignee: Johns-Manville Corporation, Greenwood Village, Colo.

[22] Filed: Dec. 7, 1972

[21] Appl. No.: 313,064

[52] U.S. Cl. .................................. 285/14, 61/12
[51] Int. Cl. ....................... F16l 55/00, E02b 13/00
[58] Field of Search ..................... 61/10, 11, 12, 13; 210/483, 497; 285/5, 6, 13, 14; 137/608

[56] References Cited
UNITED STATES PATENTS

| | | | |
|---|---|---|---|
| 1,335,899 | 4/1920 | Kahlenberg | 210/497 X |
| 1,941,537 | 1/1934 | Boosey | 285/14 |
| 2,981,072 | 4/1961 | Brewington | 61/11 |
| 3,403,519 | 10/1968 | Balko | 61/13 |
| 3,604,728 | 9/1971 | Symcha et al. | 285/14 |
| 3,693,657 | 9/1972 | Olson | 137/608 |
| 3,792,588 | 2/1974 | Gilaad | 61/12 |

Primary Examiner—Jordan Franklin
Assistant Examiner—David H. Corbin
Attorney, Agent, or Firm—Robert M. Krone; James W. McClain

[57] ABSTRACT

An irrigation dripper unit is described which connects adjacent pipeline sections and comprises an outer tubular member, an inner tubular member fitting within the outer tubular member, end portions for attachment to adjacent pipeline sections, a series of radial flanges along said inner tubular member, each flange having a notch therein, and the notches and grooves between the flanges defining a labyrinthine path for an irrigating fluid from one end of the series of flanges to the other.

2 Claims, 4 Drawing Figures

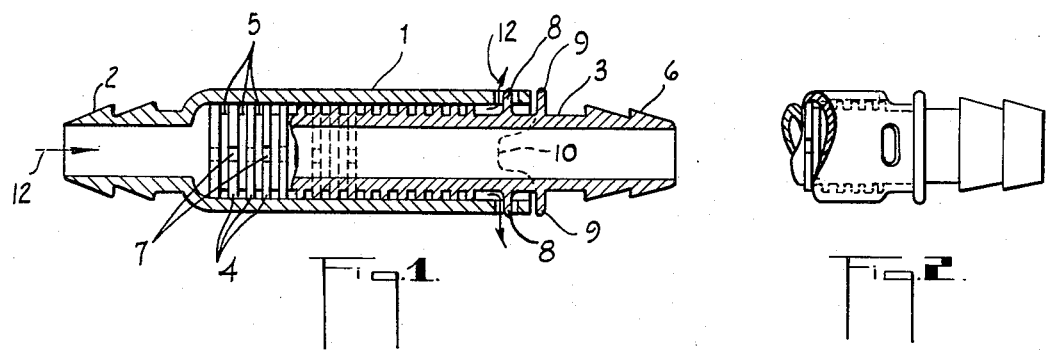
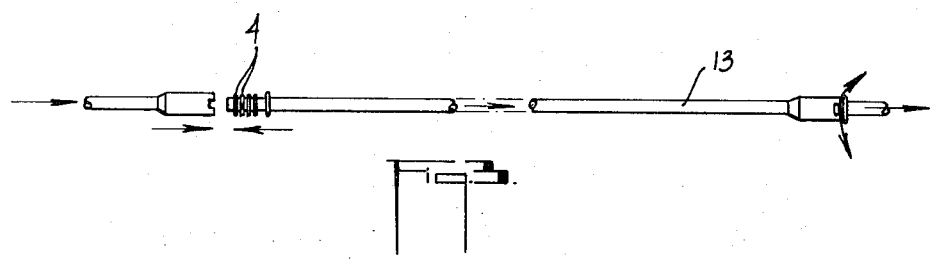
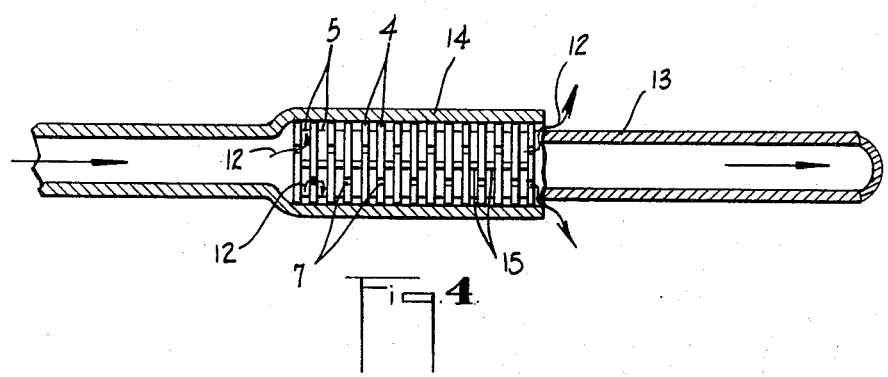

DRIP IRRIGATOR DEVICE

BACKGROUND OF THE INVENTION

This invention relates to an irrigation dripper unit for use in irrigation and in association with an irrigation supply pipe and also to a combined irrigation unit and supply pipe. The invention relates particularly to a dripper unit which can be connected in series with the supply, or, constituting an integral portion of the supply pipe, is connected in series therewith, and has means to tap off a portion of the water flowing through the unit to discharge such portion at a low drip rate.

It is an object of one aspect of the present invention to provide a new and improved form of irrigation dripper unit.

It is an object of a further aspect of the present invention to provide a new form of combined supply pipe and irrigation dripper unit.

SUMMARY OF THE INVENTION

According to one aspect of the present invention, there is provided an irrigation dripper unit to connect adjacent pipeline sections comprising: an outer tubular member; an inner tubular member fitting within the outer tubular member; one pair of opposite end portions of the inner and outer tubular members projecting beyond the other pair of opposite end portions of the outer and inner tubular members respectively, for connection to adjacent pipeline sections; a series of radial flanges axially spaced apart and attached to and projecting from the outer surface of the inner tubular member and extending to substantially fill the annular space between said inner and outer tubular members, each of said flanges having therein a notch permitting communication between opposite sides of the flange; the notches in adjacent flanges being spaced apart circumferentially so as to define a labyrinthine path for irrigating fluid passing from one end of the series of flanges axially along the inner tubular member to the other end of said inner tubular member, said labyrinthine path being radially bounded by the inner surface of the outer tubular member and the outer surface of the inner tubular member; one end of said labyrinthine path communicating with an adjacent pipe section and defining an inlet; an outlet in said unit adjacent to and communicating with the opposite end of said labyrinthine path; and connecting means for releasably connecting said tubular members together.

BRIEF DESCRIPTION OF THE DRAWINGS

FIG. 1 is a longitudinal section of an irrigation dripper unit embodying one radial flange and notch pattern in accordance with the invention;

FIG. 2 is a partial side elevation of the dripper unit shown in FIG. 1;

FIG. 3 is a side elevation of the combined pipeline section and irrigation dripper unit; and FIG. 4 is a cross-sectional view of a detail of the combination shown in FIG. 3, and also embodying another radial flange and notch design of the invention.

DETAILED DESCRIPTION OF THE INVENTION

The invention will be described by way of example and with reference to the accompanying drawing. In the embodiment shown in FIG. 1 and 2 of the drawing, the dripper unit is formed of an outer tubular casing 1 which is open at one end and whose other end is formed integrally with a connecting portion 2 adapted to be connected to an adjacent portion of the pipeline section. Fitting into this outer tubular casing 1 is an inner tubular member 3 which has formed on its outer surface a series of radial flanges 4. The flanges are spaced apart axially along a portion of the length of the outer surface of inner tubular member 3. The spaces between the adjacent radial flanges are each annular grooves 5 which are substantially bounded radially by the inner surface of the outer tubular member and the outer surface of the inner tubular member. These annular grooves do not substantially communicate with each other except by means of the notches described below. The radial flanges may be preferably spaced apart at regular intervals or, if desired, may be irregularly spaced. The end of inner tubular member 3 opposite that end which is designed to be introduced into the outer tubular casing 1 is formed as a serrated connecting end 6 adapted to be connected to the succeeding pipeline section.

Each of the radial flanges has incorporated therein a small notch 7 generally of a width approximately equal to the width of the grooves between the flanges. The notch 7 in each flange provides essentially the only means of communication between the grooves on opposite sides of that flange. Notches on adjacent flanges are spaced apart circumferentially with respect to the groove. The circumferential separate of notches in adjacent flanges should be at least 30° and preferably, the notches will be spaced 180° apart, i.e., notches in adjacent flanges will be on opposite sides of the inner tubular member, (as shown in FIG. 1) thus providing a long labyrinthine path for the fluid passing axially from one end of the series of flanges to the other end.

Adjacent the outward end of inner tubular member 3 may be provided a pair of outwardly projecting lugs 8 formed integrally with the outer wall thereof and spaced apart therefrom in a direction toward the end of the serrated connecting portion 2 is an integrally formed flange or shoulder 9. The rim 9 of the open end of the outer tubular casing 1 may be provided with a pair of incisions 10 separated from each other by a pair of elongated slots 11. The two tubular components 1 and 3 of the dripper unit are assembled and held in position with the tubular member 3 being inserted into the outer tubular casing 1 so that its lugs 8 are located within the two slots 11. In this position, the two tubular components are twisted with respect to each other by 45° as a result of which flexible casing material is sufficiently distorted to allow the lugs 8 to enter the incision in line and so as to form a flexible bayonet-like connection.

In another embodiment lugs 8 are not present, nor are the incisions 10 or slots 11. In this embodiment, the inner tubular member 3 is held within the outer tubular member 1 by the friction of the outer edges of the radial flanges 4 against the inner surface of outer tubular 1. In this embodiment the irrigating fluid passing through the labyrinthine path exits through the notch or a plurality of notches in the last radial flange and passes out through the open annulus formed between the inner surface of outer tubular member 1 and the outer surface of inner tubular member 3. Shoulders 9 may be present if it is desired to limit the depth to which the inner member can be inserted into the outer member. If the shoulders 9 are present, they must either be discontinuous so as not to completely seal off the end of outer member 1, or, if the shoulder 9 is a continuous radial flange, then some sort of exit port analogous to incisions 9 must be provided in the wall of outer tubular member 1.

Water or other irrigating fluid (such as a dilutaqueous solution of liquid fertilizer) flowing through the pipeline section provided with such dripper units has a portion thereof diverted so as to pass in the direction of arrows 12 through the labyrinthrine path defined by the notched flanges and grooves therebetween, the outer wall of the inner tubular member, and the inner wall of the outer tubular member so as to emerge as a practically pressureless drip at the exit of the labyrinthine path and thereafter pass out of the unit and drip slowly onto the ground to be irrigated.

All embodiments described and shown in FIGS. 1 through 4 are capable of ready disassembly for cleaning or replacement.

FIG. 3 shows a combined pipeline section and dripper unit. As seen in the drawing the pipeline section 13 is formed integrally at one end with a tubular casing which is identical in construction with the outer tubular casing 1 described with reference to FIG. 1 of the drawings. The other end of the pipeline section 13 is formed integrally with a series of notched radially flanges 4 of identical construction to that of the flanges of tubular member 3 described with reference to FIG. 1 of the drawings. As can be seen in FIG. 3 and in detail in FIG. 4 the tubular member of one unit 13 is inserted into the tubular casing 14 of the adjacent unit 13 and retained by means of a bayonet coupling, friction, or other coupling means.

Alternatively, the units illustrated in FIG. 1 and 2 may be joined by conventional hoses or other tubular conduit means which are pressed over the serrated end portions 2 and 6 and retained thereupon by the frictional forces of the serrated surfaces.

FIG. 4 also illustrates a second embodiment of the radial flange and notch design of this invention. In this embodiment each adjacent pair of spaced apart radial flanges 4 is separated by a groove 5 which has therein a barrier 15. This barrier 15 completely fills and blocks the groove and prevents the irrigating fluid from flowing completely around the annular groove. The notches 7 in each of the adjacent radial flanges are located adjacent to the barrier in the groove, but on opposite sides thereof, as illustrated in FIG. 4. The irrigating fluid passing through the notch in one radial flange is prevented by the adjacent barrier from flowing directly to the notch in the next adjacent downstream flange. It rather must flow through the entire length of the groove, i.e., almost entirely around the circumference of the inner tubular member, to reach the notch in the next downstream flange.

In another embodiment of the device of the invention, shown in FIG. 4, the final downstream radial flange is provided with a plurality of notches or openings so that the water exiting from the labyrinthine path is spread somewhat uniformly throughout the exit annulus of the device.

In the drawings the radial flanges are shown as all of the same diameter so as to define a cylinder. They may also be of increasing diameter so as to define a portion of a cone. The inner surface of the outer tubular member will of course have a corresponding configuration.

What I claim is:

1. An irrigation dripper unit to connect adjacent pipeline sections comprising:
   an outer tubular member;
   an inner tubular member fitting within said outer tubular member;
   one pair of opposite end portions of said inner and outer tubular members projecting beyond the other pair of opposite end portions of said outer and inner tubular members respectively, for connection to adjacent pipeline sections;
   a series of radial flanges axially spaced apart and attached to and projecting from the outer surface of said inner tubular member, each of said flanges extending circumferentially entirely around said inner tubular member and extending to substantially fill the annular space between said inner and outer tubular members, each of said flanges having therein a notch permitting fluid communication between opposite sides of the flange;
   the notches in adjacent flanges being spaced apart circumferentially whereby there is defined a labyrinthine path for irrigation fluid passing from one end of said series of flanges axially along said inner tubular member to the other end of said inner tubular member, said labyrinthine path being radially bounded by the inner surface of said outer tubular member and the outer surface of said inner tubular member;
   a groove between each pair of adjacent radial flanges, wherein each groove has therein a barrier which completely blocks said groove and the notches in the adjacent pair of radial flanges being adjacent to, but spaced on opposite sides of said barrier, each of said grooves extending circumferentially around said inner tubular member from one side of said barrier to the other side of said barrier, thereby defining a fluid path which essentially encircles said inner tubular member;
   one end of said labyrinthine path communicating with an adjacent pipe section and defining an inlet;
   an outlet in said unit adjacent to and communicating with the opposite end of said labyrinthine path; and
   connecting means formed in said unit for releasably connecting said tubular members together.

2. The irrigation dripper unit as described in claim 1, wherein the last downstream radial flange in said series of radial flanges has therein a plurality of openings.

* * * * *